(12) United States Patent
Fulcher, Jr.

(10) Patent No.: US 11,357,338 B2
(45) Date of Patent: Jun. 14, 2022

(54) WEARABLE BABY CARRIERS WITH MULTIPLE OPERATION MODES, AND BABY SUPPORT SYSTEMS COMPRISING SUCH WEARABLE BABY CARRIERS

(71) Applicant: Paul Anthony Fulcher, Jr., San Jose, CA (US)

(72) Inventor: Paul Anthony Fulcher, Jr., San Jose, CA (US)

(73) Assignee: Paul Anthony Fulcher, Jr., San Jose, CA (US)

( * ) Notice: Subject to any disclaimer, the term of this patent is extended or adjusted under 35 U.S.C. 154(b) by 200 days.

(21) Appl. No.: 16/888,731

(22) Filed: May 31, 2020

(65) Prior Publication Data
US 2021/0369002 A1 Dec. 2, 2021

(51) Int. Cl.
*A47D 13/02* (2006.01)
*B60N 2/28* (2006.01)
*A47D 13/10* (2006.01)
*B62B 7/14* (2006.01)

(52) U.S. Cl.
CPC .......... *A47D 13/02* (2013.01); *B60N 2/2842* (2013.01); *A47D 13/025* (2013.01); *A47D 13/10* (2013.01); *B62B 7/14* (2013.01)

(58) Field of Classification Search
CPC ...... A47D 13/02; A47D 13/025; A47D 13/10; A47D 13/102; A47D 13/105; A47D 13/107; B62B 7/14; B60N 2/26; B60N 2/2842; B60N 2/2848; A45F 3/08; A45F 3/10
USPC ........................................................ 224/628
See application file for complete search history.

(56) References Cited

U.S. PATENT DOCUMENTS

| | | | | |
|---|---|---|---|---|
| 4,911,346 A | * | 3/1990 | Shallman | A45F 3/08 224/261 |
| 5,140,995 A | * | 8/1992 | Uhl | A63B 71/08 2/92 |
| 5,328,447 A | * | 7/1994 | Kapounek | A61F 5/055 2/92 |
| 5,685,466 A | * | 11/1997 | Hsieh | A47D 13/025 224/159 |
| 5,768,717 A | * | 6/1998 | Le Sueur | A41D 13/015 2/455 |
| 6,017,088 A | * | 1/2000 | Stephens | A47D 13/025 297/130 |
| 6,415,969 B1 | * | 7/2002 | Higuchi | A47D 13/025 224/159 |

(Continued)

FOREIGN PATENT DOCUMENTS

GB 2268394 A * 1/1994 ............ A47D 1/002

*Primary Examiner* — Justin M Larson
(74) *Attorney, Agent, or Firm* — Vista IP Law Group, LLP

(57) ABSTRACT

A wearable baby carrier includes: a pad; a first strap coupled to, or configured for coupling to, the pad via a first strap connector; a second strap coupled to, or configured for coupling to, the pad via a second strap connector; and a first device connector coupled to the pad; wherein the wearable baby carrier has a first operation mode, and a second operation mode; wherein in the first operation mode, the wearable baby carrier is configured to support a weight of a baby while the wearable baby carrier is worn by the user via the first strap and the second strap; and wherein in the second operation mode, the wearable baby carrier is configured to detachably couple to a baby device via the first device connector while the wearable baby carrier is not worn by the user.

23 Claims, 11 Drawing Sheets

(56) References Cited

U.S. PATENT DOCUMENTS

| | | | | |
|---|---|---|---|---|
| 6,687,920 B2* | 2/2004 | Berns | ............ | A41D 13/0531 2/92 |
| 6,852,087 B1* | 2/2005 | Dainese | ............ | A41D 13/0153 2/455 |
| 6,979,057 B2* | 12/2005 | Sedlack | ............ | B60N 2/2851 297/250.1 |
| 6,983,986 B2* | 1/2006 | Jane Santamaria | .. | B60N 2/2845 297/130 |
| 7,329,230 B2* | 2/2008 | Mazzarolo | ............ | A41D 13/0531 2/455 |
| 7,444,695 B2* | 11/2008 | Gonzalez | ............ | A47D 13/025 5/655 |
| 7,819,831 B2* | 10/2010 | Dellanno | ............ | A61F 5/026 450/2 |
| 8,037,549 B2* | 10/2011 | Saur | ............ | A63B 71/148 2/455 |
| 8,276,985 B2* | 10/2012 | Kho | ............ | A47D 1/10 280/47.38 |
| 8,321,973 B2* | 12/2012 | Bickley | ............ | A47D 13/02 5/95 |
| 8,408,435 B2* | 4/2013 | Refsum | ............ | A41B 13/00 224/159 |
| 8,550,316 B2* | 10/2013 | Coote | ............ | A47D 15/006 224/159 |
| 8,931,839 B1* | 1/2015 | Laurel, Jr. | ............ | A47D 1/00 297/250.1 |
| 8,960,794 B2* | 2/2015 | St. Pierre | ............ | B60N 2/32 297/256.16 |
| 9,439,515 B2* | 9/2016 | Kim | ............ | A45F 3/14 |
| 9,504,307 B1* | 11/2016 | Burnett | ............ | A45F 3/10 |
| 9,596,947 B2* | 3/2017 | Lee | ............ | A47D 13/025 |
| 9,756,960 B2* | 9/2017 | Alegria | ............ | A47D 13/10 |
| 9,756,961 B2* | 9/2017 | Haut | ............ | A47D 1/006 |
| 9,955,801 B2* | 5/2018 | Yu | ............ | B60N 2/2821 |
| 10,413,085 B2* | 9/2019 | Haut | ............ | A47D 1/002 |
| 10,631,664 B2* | 4/2020 | Kee | ............ | A47D 13/025 |
| 10,905,251 B2* | 2/2021 | Herron | ............ | G10K 11/175 |
| 11,001,288 B2* | 5/2021 | Valiulis | ............ | B62B 3/144 |
| 2005/0279785 A1* | 12/2005 | Liistro | ............ | A47D 13/025 224/160 |
| 2006/0138826 A1* | 6/2006 | Caton | ............ | B62B 7/14 297/256.16 |
| 2009/0206116 A1* | 8/2009 | Grant | ............ | A45F 3/08 224/160 |
| 2009/0302075 A1* | 12/2009 | Trainer | ............ | A47D 13/025 224/160 |
| 2010/0032460 A1* | 2/2010 | Hyde | ............ | A47D 13/02 224/160 |
| 2010/0065594 A1* | 3/2010 | Liljedahl | ............ | A47D 13/025 224/160 |
| 2010/0116856 A1* | 5/2010 | Tompros | ............ | A47D 13/02 224/160 |
| 2010/0155446 A1* | 6/2010 | Stein | ............ | A47D 13/025 224/159 |
| 2013/0285424 A1* | 10/2013 | Gardner | ............ | B60N 2/2812 297/250.1 |
| 2015/0282636 A1 | 10/2015 | Wang | | |
| 2016/0128491 A1* | 5/2016 | Martiniuk | ............ | B62B 9/12 224/160 |
| 2017/0129524 A1 | 5/2017 | Wang et al. | | |
| 2018/0148081 A1 | 5/2018 | Wang et al. | | |
| 2019/0255973 A1 | 8/2019 | Shahbandar | | |
| 2020/0383495 A1* | 12/2020 | Sheldrick | ............ | A47D 15/006 |
| 2021/0022523 A1* | 1/2021 | Boshoff | ............ | A47D 13/107 |
| 2021/0129716 A1* | 5/2021 | Shahbandar | ............ | A47D 13/025 |
| 2021/0284048 A1* | 9/2021 | Shahbandar | ............ | A47D 13/025 |
| 2021/0315365 A1* | 10/2021 | Lutin | ............ | A45F 3/04 |
| 2021/0369002 A1* | 12/2021 | Fulcher, Jr. | ............ | A47D 11/00 |

* cited by examiner

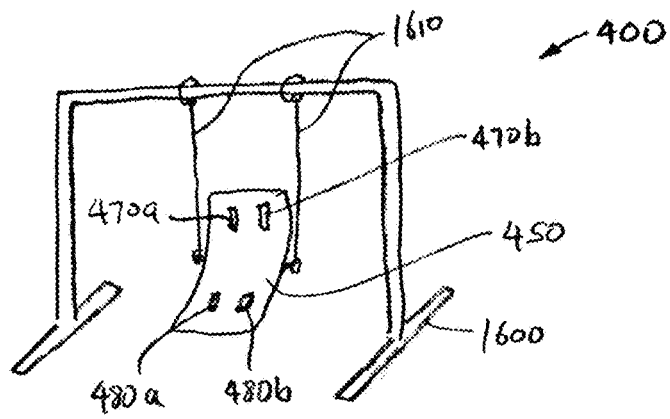
FIG. 16
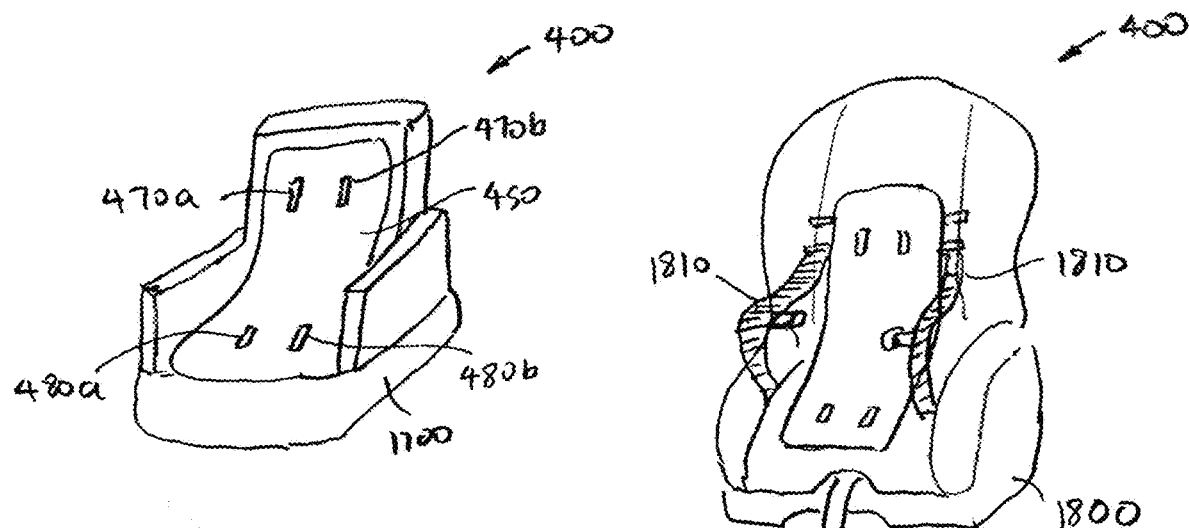
FIG. 17
FIG. 18

WEARABLE BABY CARRIERS WITH MULTIPLE OPERATION MODES, AND BABY SUPPORT SYSTEMS COMPRISING SUCH WEARABLE BABY CARRIERS

FIELD

The field of the subject disclosure relates to baby carriers, baby devices for attachment with baby carriers, and baby support systems having baby carriers and baby devices.

BACKGROUND

Baby carriers have been used to carry babies. A baby carrier may include shoulder straps for allowing a user (e.g., a caregiver) of the baby carrier to wear the baby carrier.

Sometimes, after a user of a baby carrier has carried the baby in the baby carrier, the user may want to transfer the baby from the baby carrier to another location, such as to a bed, a car seat, etc. However, if the baby is asleep in the baby carrier, the transfer of the baby from the baby carrier to another location may cause the baby to wake up. This is because removal of the baby from the baby carrier may involve the user lifting the baby away from the baby carrier, and placing the baby onto the new location. Sometimes, the new location may have a cold surface that can cause discomfort to the baby when the baby is placed in contact with the cold surface, thereby causing the baby to wake up.

Also, even if the baby is not asleep in the baby carrier, transferring the baby away from the baby carrier, and placing the baby onto a new location may be troublesome. In addition, the baby may prefer to stay in the baby carrier, and may not like to be placed on the new location. This is especially the case if the new location has a cold surface that can cause discomfort to the baby.

SUMMARY

A wearable baby carrier includes: a pad; a first strap coupled to, or configured for coupling to, the pad via a first strap connector, wherein the first strap is configured to extend over a first shoulder of a user of the wearable baby carrier; a second strap coupled to, or configured for coupling to, the pad via a second strap connector, wherein the second strap is configured to extend over a second shoulder of the user; and a first device connector coupled to the pad; wherein the wearable baby carrier has a first operation mode, and a second operation mode; wherein in the first operation mode, the wearable baby carrier is configured to support a weight of a baby while the wearable baby carrier is worn by the user via the first strap and the second strap; and wherein in the second operation mode, the wearable baby carrier is configured to detachably couple to a baby device via the first device connector while the wearable baby carrier is not worn by the user.

Optionally, the wearable baby carrier further includes a spine coupled to the pad.

Optionally, the spine comprises a plurality of spine components that are moveably connected in a series.

Optionally, the first device connector comprises a first rigid loop configured to detachably couple with a first latch at the baby device.

Optionally, the wearable baby carrier further includes a second rigid loop coupled to the pad, wherein the second rigid loop is configured to detachably couple with a second latch at the baby device.

Optionally, the wearable baby carrier further includes a first protrusion configured for insertion into a first opening of the baby device.

Optionally, the first protrusion comprises a first hook configured to anchor against a part of the baby device when the first hook is inserted into the first opening of the baby device.

Optionally, the wearable baby carrier further includes a second protrusion configured for insertion into a second opening of the baby device.

Optionally, the first device connector of the wearable baby carrier is configured to detachably couple to a first connector of the baby device, wherein one of the first device connector of the wearable baby carrier and the first connector of the baby device comprises a key hole, and the other one of the first device connector of the wearable baby carrier and the first connector of the baby device comprises a disc for insertion into the key hole.

Optionally, the first device connector comprises one or more tabs configured to mate with an axel of a cam lock at the baby device.

Optionally, the wearable baby carrier further includes a latch release mechanism coupled to the pad.

Optionally, the wearable baby carrier further includes a second device connector coupled to the pad, wherein the first device connector and the second device connector are configured to detachably couple to a first connector and a second connector, respectively, at the baby device.

Optionally, the first strap connector comprises a first snap-fit connector, and the second strap connector comprises a second snap-fit connector.

Optionally, the baby device comprises at least a part of a stationary baby support, and wherein the wearable baby carrier is configured to detachably couple to the part of the stationary baby support via the first device connector.

Optionally, the baby device comprises at least a part of a stroller, and wherein the wearable baby carrier is configured to detachably couple to the part of the stroller via the first device connector.

Optionally, the baby device comprises at least a part of a baby-rocker, and wherein the wearable baby carrier is configured to detachably couple to the part of the baby-rocker via the first device connector.

Optionally, the baby device comprises at least a part of a baby chair, and wherein the wearable baby carrier is configured to detachably couple to the part of the baby chair via the first device connector.

Optionally, the baby device comprises at least a part of a child car seat, and wherein the wearable baby carrier is configured to detachably couple to the part of the child car seat via the first device connector.

A baby support system includes the wearable baby carrier, and the baby device.

Optionally, the baby device comprises at least a part of a stationary baby support, at least a part of a stroller, at least a part of a baby-rocker, at least a part of a baby chair, or at least a part of a child car seat; and wherein the wearable baby carrier is configured to detachably couple to the part of the stationary baby support, to the part of the stroller via the first device connector, to the part of the baby-rocker via the first device connector, to the part of the baby chair via the first device connector, or to the part of the child car seat via the first device connector.

Optionally, the baby device comprises a base and an interface component moveably coupled to the base to adjust an angle of the interface component relative to the base; and wherein the wearable baby carrier is configured to detachably couple to the interface component of the baby device via the first device connector.

A wearable baby carrier includes: a pad; a first strap coupled to, or configured for coupling to, the pad via a first strap connector, wherein the first strap is configured to extend over a first shoulder of a user of the wearable baby carrier; a second strap coupled to, or configured for coupling to, the pad via a second strap connector, wherein the second strap is configured to extend over a second shoulder of the user; a spine coupled to the pad, the spine comprising a plurality of spine components that are moveably connected in a series; a first device connector coupled to the pad; and a second device connector coupled to the pad; wherein the wearable baby carrier is configured to detachably couple to a baby device via the first connector when the wearable baby carrier is not worn by the user; and wherein the first device connector and the second device connector are configured to detachably couple to a first connector and a second connector, respectively, at the baby device.

An interface component is configured for detachably coupling a wearable baby carrier with a baby device, the wearable baby carrier comprising a pad, a first strap configured for coupling to the pad via a first strap connector, a second strap configured for coupling to the pad via a second strap connector, and a first device connector; the interface component comprising: a receiving surface configured to receive the wearable baby carrier; a securing mechanism configured to secure the interface component to the baby device; and one or more connectors configured to detachably couple with corresponding one or more device connectors at the wearable baby carrier.

Optionally, a baby device includes the interface component.

Optionally, the baby device comprises a stationary baby support, a stroller, a baby-rocker, a baby chair, or a child car seat.

Other and further aspects and features will be evident from reading the following detailed description.

BRIEF DESCRIPTION OF THE DRAWINGS

The drawings illustrate the design and utility of embodiments, in which similar elements are referred to by common reference numerals. In order to better appreciate how advantages and objects are obtained, a more particular description of the embodiments will be described with reference to the accompanying drawings. Understanding that these drawings depict only exemplary embodiments and are not therefore to be considered limiting in the scope of the claimed invention.

FIG. 16 illustrates another example of a baby device to which the wearable baby carrier of FIG. 1 is configured to detachably attach.

FIG. 17 illustrates another example of a baby device to which the wearable baby carrier of FIG. 1 is configured to detachably attach.

FIG. 18 illustrates another example of a baby device to which the wearable baby carrier of FIG. 1 is configured to detachably attach.

DESCRIPTION OF THE EMBODIMENTS

Figure 1:
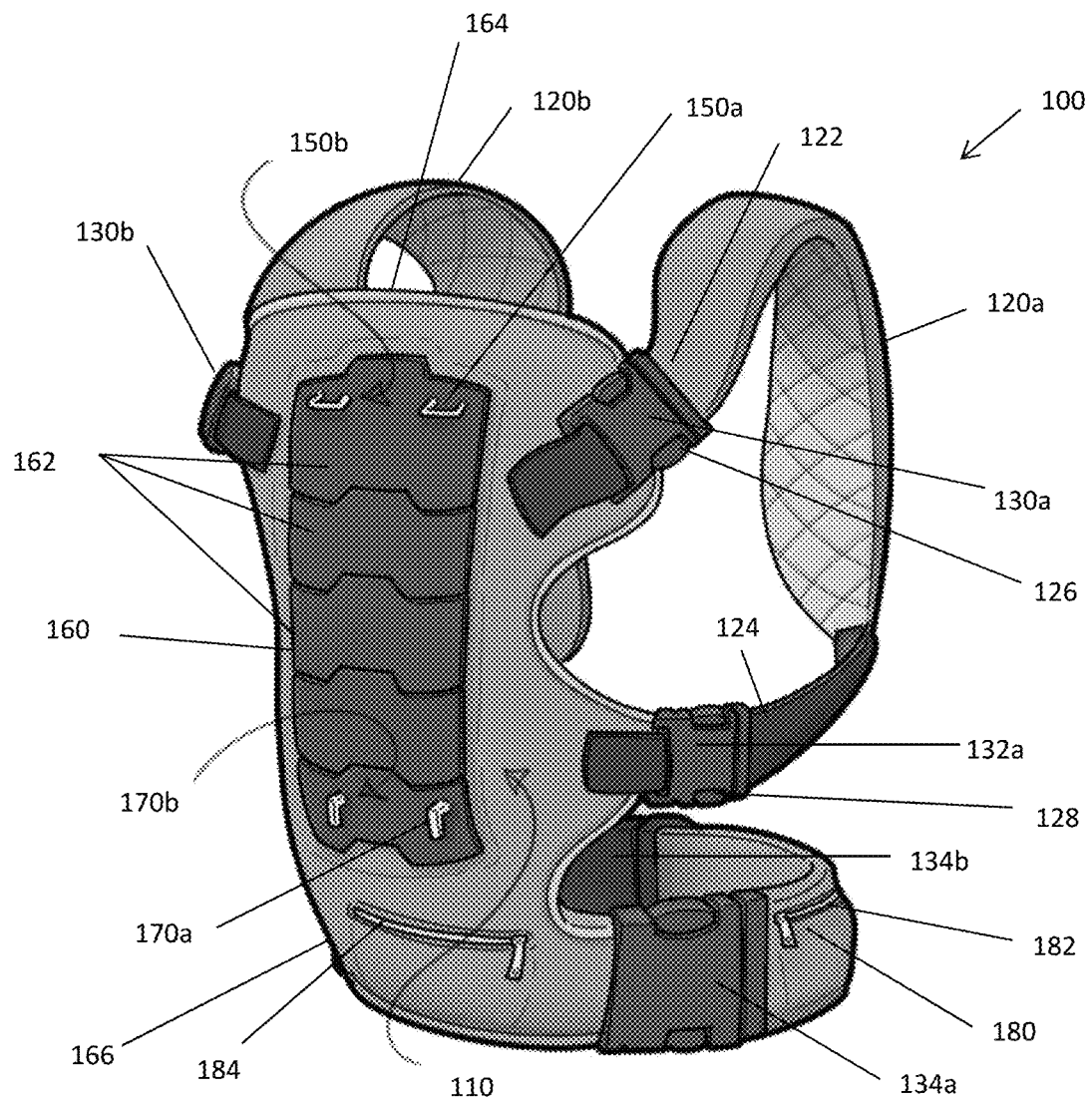
FIG. 1 illustrates a wearable baby carrier having a pad and first and second straps.

Various embodiments are described hereinafter with reference to the figures. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages of the invention shown. An aspect or an advantage described in conjunction with a particular embodiment is not necessarily limited to that embodiment and can be practiced in any other embodiments even if not so illustrated or if not so explicitly described.

Figure 2:
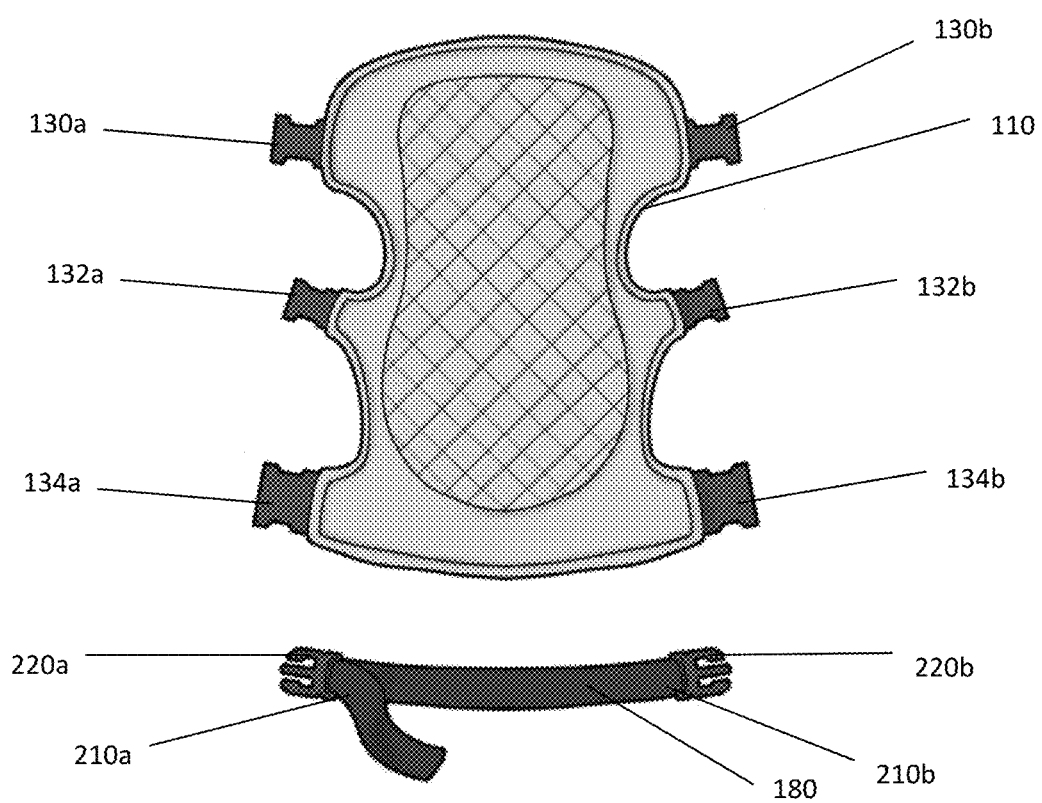
FIG. 2 illustrates the pad of FIG. 1, and a waist band for attachment to the pad of FIG. 1.
Figure 3:
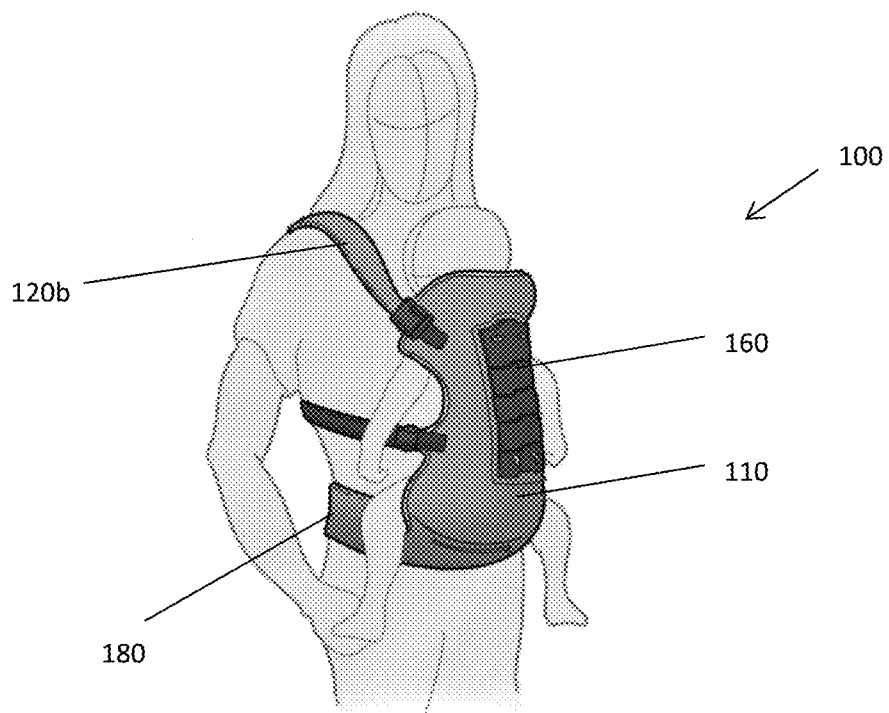
FIG. 3 illustrates a first operation mode of the wearable baby carrier of FIG. 1.

FIGS. 1-2 illustrate a wearable baby carrier 100. The baby carrier 100 has a pad 110, a first strap 120a, and a second strap 120b. The first strap 120a is coupled to, or is configured for coupling to, the pad 110 via first strap connectors 130a, 132a. The first strap 120a is configured to extend over a first shoulder of a user of the wearable baby carrier 100. The second strap 120b is coupled to, or is configured for coupling to, the pad 110 via second strap connectors 130b, 132b (shown in FIG. 2). The second strap 120b is configured to extend over a second shoulder of the user. The wearable baby carrier 100 also includes a first device connector 150a and a second device connector 150b coupled to the pad 110. The wearable baby carrier 100 has a first operation mode, and a second operation mode. In the first operation mode, the wearable baby carrier 100 is configured to support a weight of a baby while the wearable baby carrier 100 is worn by the user via the first strap 120a and the second strap 120b (FIG. 3). As shown in FIG. 3, the baby carrier 100 may be worn in front of a user. Alternatively, the baby carrier 100 may be worn behind the user. In the second operation mode, the wearable baby carrier 100 is configured to detachably couple to a baby device 400 (such as any of those shown in FIGS. 4, 9, and 15) via the first device connector 150 while the wearable baby carrier 100 is not worn by the user. Examples of baby devices 400 will be described with reference to FIGS. 4-9 and 15.

In the illustrated embodiments of FIG. 1, the wearable baby carrier 100 further includes a spine 160 coupled to the pad 110. The spine 160 comprises a plurality of spine components 162 that are moveably connected in a series. Each spine component 162 may be rigid or semi-rigid (e.g., bendable in response to force). Also, the spine 160 formed by the spine component 162 may be semi-rigid in the sense that it provides some degree of rigidity at certain parts of the pad 110, while allowing different parts of the pad 110 to move relative to each other (e.g., the pad 110 is bendable subject to certain restraint on the degree of freedom). As shown in the figure, the spine components 162 are aligned vertically to form one column of spine components 162 between a top end 164 and a bottom end 166 of the pad 110. In other embodiments, the spine components 162 may be aligned horizontally. In further embodiments, the spine components 162 may from a two-dimensional matrix having both rows and columns. In still further embodiments, the wearable baby carrier 100 may include multiple columns of spine components 162, or multiple rows of spine components 162. In one or more embodiments described herein, two adjacent spine components 162 may be rotatably coupled so that they can rotate relative to each other. In some cases, the range of rotation between two adjacent spine components 162 may be predetermined and mechanical limited (e.g., using a stopper). This feature allows a curvature formed by the spine components 162 to be limited to a certain range. The spine components 162 may be made from any materials, such as plastic, metal, alloy, polymer, carbon fiber, etc., or any combination of the foregoing. As shown in the illustrated example, each spine component 162 is a plate having a planar configuration, wherein the planar configuration may be a rectilinear planar configuration or a curvilinear planar configuration. It should be noted that the spine 160 is not limited to the configuration shown, and that the spine 160 may have other configurations in other embodiments. For example, in other embodiments, the spine 160 may include one or more wires. Also, in other embodiments, instead of disposing the spine 160 at a front surface of the pad 110 like that shown in the figure, the spine 160 may be disposed at a back surface (i.e., opposite from the front surface) of the pad 110. In further embodiments, the spine 160 may be embedded within the pad 110. For example, in some cases, the pad may include cloth or fabric at exterior surfaces, and may define a cavity for accommodating the spine 160.

As shown in FIG. 1, the first device connector 150*a* comprises a first rigid loop configured to detachably couple with a first connector (e.g., a latch, a hook, etc.) at the baby device 400, and the second device connector 150*b* comprises a second rigid loop configured to detachably couple with a second connector (e.g., a latch, a hook, etc.) at the baby device 400. The wearable baby carrier 100 further includes a first protrusion 170*a* configured for insertion into a first opening of the baby device, and a second protrusion 170*b* configured for insertion into a second opening of the baby device. In the illustrated example, the first protrusion 170*a* comprises a first hook configured to anchor against a part of the baby device when the first hook is inserted into the first opening of the baby device. Similarly, the second protrusion 170*b* comprises a first hook configured to anchor against a part of the baby device when the second hook is inserted into the second opening of the baby device. In other embodiments, each of the first protrusion 170*a* and the second protrusion 170*b* may have other configurations (e.g., shapes and/or sizes).

The device connectors 150*a*, 150*b* and/or the protrusions 170*a*, 170*b* may be made from any materials, such as metal, alloy, plastics, polymer (e.g., high strength polymer), etc. As shown in FIG. 1, the device connectors 150*a*, 150*b* and the protrusions 170*a*, 170*b* are secured to the spine 160, and therefore they are indirectly coupled to the pad 110 via the spine 160. Securing the device connectors 150*a*, 150*b* and the protrusions 170*a*, 170*b* to the spine 160 is advantageous because the spine components 162 of the spine 160 provide a sturdy platform for supporting the device connectors 150*a*, 150*b* and the protrusions 170*a*, 170*b*. In the illustrated embodiments, the device connectors 150*a*, 150*b* are secured to one of the spine components 162, and the protrusions 170*a*, 170*b* are secured to another one of the spine components 162. This feature is advantageous because it allows a pre-determined desired curvature of the spine 160 to be formed by the spine components 162 when the baby carrier 100 is detachably coupled to the baby device 400. In other embodiments, the device connectors 150*a*, 150*b* and the protrusions 170*a*, 170*b* may be coupled directly to the pad 110. For example, in other embodiments, the device connectors 150*a*, 150*b* and/or the protrusions 170*a*, 170*b* may be secured to the pad 110 directly, e.g., via hardware, stitches, etc.

The device connectors 150*a*, 150*b* and the protrusions 170*a*, 170*b*, and their operation will be further described.

As shown in FIG. 1, each of the first and second straps 120*a*, 120*b* has a first end 122, and a second end 124 opposite from the first end 122. Each of the straps 120*a*, 120*b* also has a first end connector 126 and a second end connector 128 configured to detachably couple with the strap connectors 130, 132, respectively. Having both ends 122, 124 of each strap 120 detachable from the pad 110 is advantageous because in some embodiments, after the pad 110 of the baby carrier 100 is detachably coupled to a baby device, the straps 120*a*, 120*b* may be completely removed from the pad 110 of the baby carrier 100. In some embodiments, after the straps 120*a*, 120*b* are removed from the pad 110, an accessory device, such as a safety belt, may be detachably coupled with the pad 110 using the same connectors 130*a*, 130*b*, 132*a*, 132*b*.

In the illustrated example, the strap connectors 130*a*, 130*b*, 132*a*, 132*b* at the pad 110 are female connectors, and the connectors 126, 128 at the straps 120*a*, 120*b* are male connectors. In other embodiments, the strap connectors 130*a*, 130*b*, 132*a*, 132*b* at the pad 110 may be male connectors, and the connectors 126, 128 at the straps 120*a*, 120*b* may be female connectors. In some embodiments, each male connector may be a male snap-fit connector, and each female connector may be a female snap-fit connector. In further embodiments, the strap connectors 130*a*, 130*b*, 132*a*, 132*b* may be other types of connectors, and may have other configurations. For examples, in other embodiments, the strap connectors 130*a*, 130*b*, 132*a*, 132*b* may be implemented using frictional fit connectors, buttons, belt loops, clips, anchors, etc. Also, in other embodiments, one or both ends of each of the straps 120*a*, 120*b* may be permanently secured to the pad 110 (e.g., via stitching, and/or adhesive, etc.). In such cases, the stitching and/or the adhesive may be considered example(s) of the strap connector 130/132.

The wearable baby carrier 100 also includes a waist band 180 configured to detachably couple with the pad 110 via waist band connectors 134a, 134b at the pad 110. The waist band 180 includes one or more pockets 182 for allowing a user to store items. As shown in FIGS. 1-2, the waist band 180 has a first end 210a and a second end 210b opposite from the first end 210a. The waist band 180 also includes a first waist band connector 220a for detachably coupling with the first waist band connector 134a at the pad 110, and a second waist band connector 220b for detachably coupling with the second waist band connector 134b at the pad 110. In the illustrated example, the waist band connectors 134 at the pad 110 are female connectors, and the waist band connectors 220 at the waist band 180 are male connectors. In other embodiments, the waist band connectors 134 at the pad 110 may be male connectors, and the waist band connectors 220 at the waist band 180 may be female connectors. In further embodiments, the waist band connectors 134, 220 may be other types of connectors, and may have other configurations. For examples, in other embodiments, the waist band connectors 134, 220 may be implemented using frictional fit connectors, buttons, belt loops, clips, anchors, etc. In other embodiments, the waist band 180 is optional, and the baby carrier 100 may not include the waist band 180 and the waist band connectors 134a, 134b.

As shown in FIG. 1, the baby carrier 100 may also optionally include one or more pockets 184 for allowing storage of items.

In some embodiments, the top part (i.e., the part including the top end 164) of the pad 110 may be configured to support a neck, a back, or a chest of a baby. In other embodiments, the top art of the pad 110 may be configured to support a head of a baby. In further embodiments, baby carrier 100 may include a headrest coupled to the top end 164 of the pad 110. The headrest may be permanently coupled to the pad 110, and may be considered to be a part or an extension of the pad 110. Alternatively, the headrest may be an accessory component that is detachably secured to the pad 110.

Figure 4:
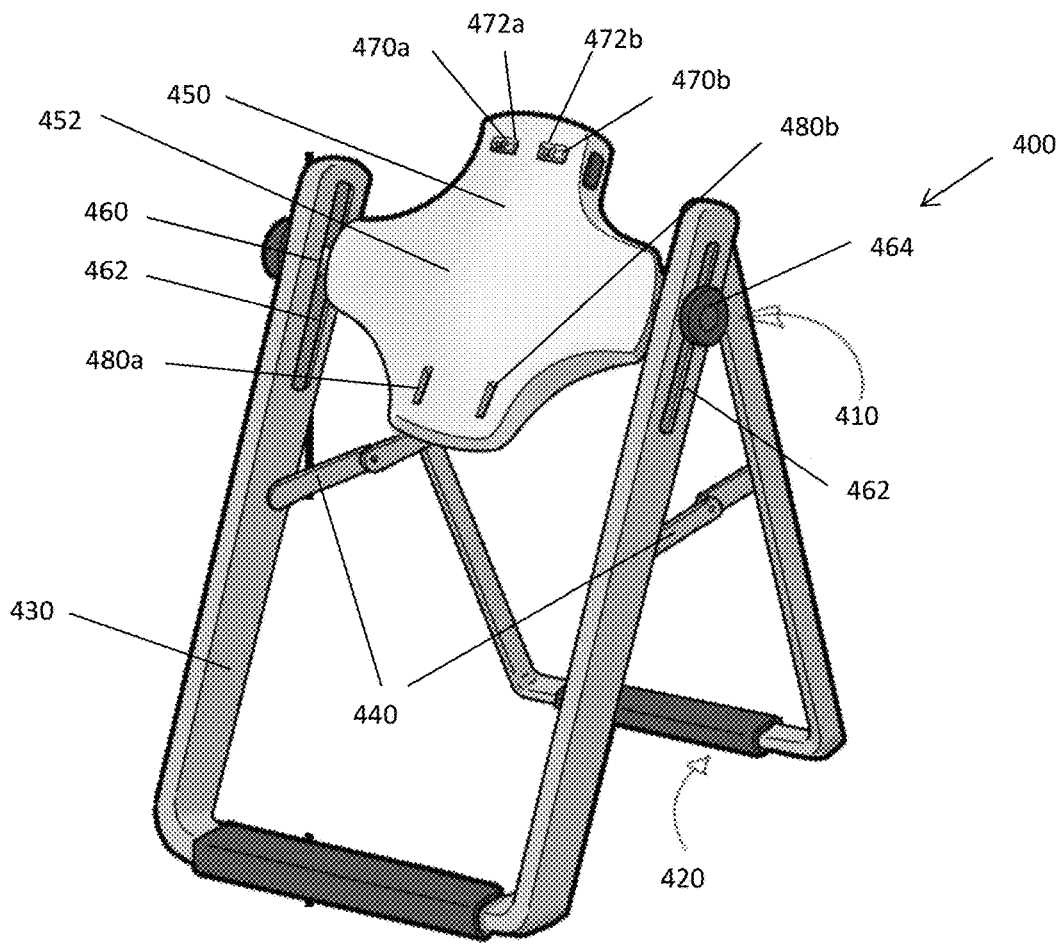
FIG. 4 illustrates an example of a baby device to which the wearable baby carrier of FIG. 1 is configured to detachably attach.

FIG. 4 illustrates an example of a baby device 400 to which the wearable baby carrier 100 of FIG. 1 is configured to detachably attach. In the illustrated example, the baby device 400 is a stationary baby support. The baby device 400 includes a base 410 having support members 420, 430. The support members 420, 430 are rotatably coupled to each other so that they can rotate relative to each other to selectively bring the baby device 400 from a closed or collapsed configuration to an opened or operational configuration, or vice versa. The base 410 also includes locking members 440 configured to lock the support members 420, 430 in position relative to each other. As shown in the figure, the baby device 400 also includes an interface component 450 configured to receive the wearable baby carrier 100. In the illustrated example, the interface component 450 has a surface 452 for allowing the wearable baby carrier 100 to be placed against. The interface component 450 also includes a first connector 470a in a first hole 470a and a second connector 470b in a second hole 470b. The first and second connectors 470a, 470b are configured to respectively couple with the first device connector 150a and the second device connector 150b of the baby device 100. In addition, the interface component 450 includes a first opening 480a and a second opening 480b configured to respectively couple with the first protrusion 170a and the second protrusion 170b of the baby device 100.

Figure 5:
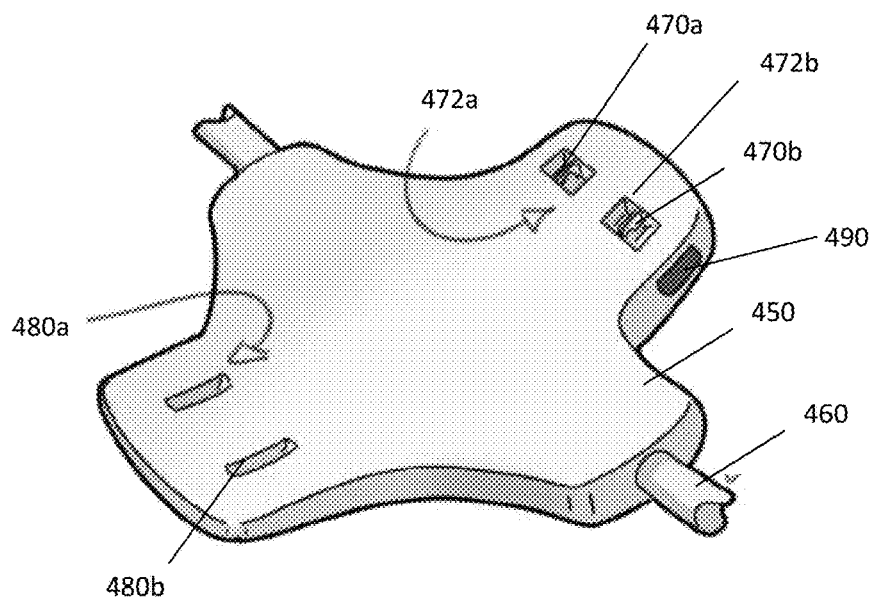
FIG. 5 illustrates a component of the baby device of FIG. 4.
Figure 6:
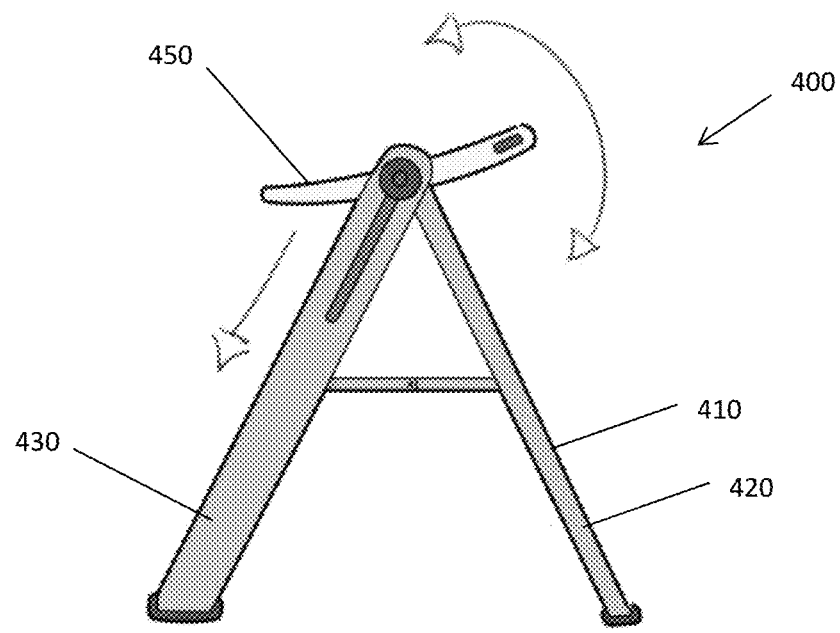
FIG. 6 illustrates a side view of the baby device of FIG. 4.

As shown in FIGS. 4-5, the baby device 400 also includes a shaft 460 that couples the interface component 450 with the base 410. The shaft 460 allows the interface component 450 to rotate relative to the base 410. In the illustrated embodiments, the shaft 460 extends through slots 462 at the base 410. The slots 462 allow the shaft 460 to translate relative to the base 410, so that a user can selectively adjust a height of the interface component 450 relative to the base 410 (FIG. 6). The slots 462 also allow the shaft 460 to rotate relative to the base 410, so that the user can selectively adjust an orientation (e.g., angle) of the interface component 450 relative to the base 410 (FIG. 6). The baby device 400 also includes a locking mechanism 464 configured to lock the interface component 450 at a desired orientation and/or height relative to the base 410.

Figure 7A:
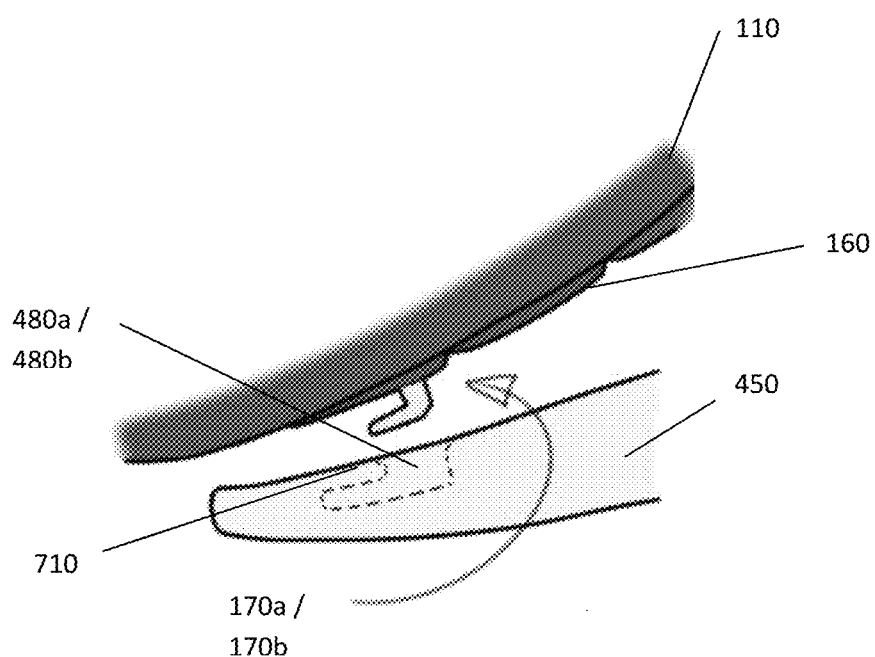
FIG. 7A-7B illustrates a technique for detachably mounting a wearable baby carrier to a baby device.
Figure 7B:
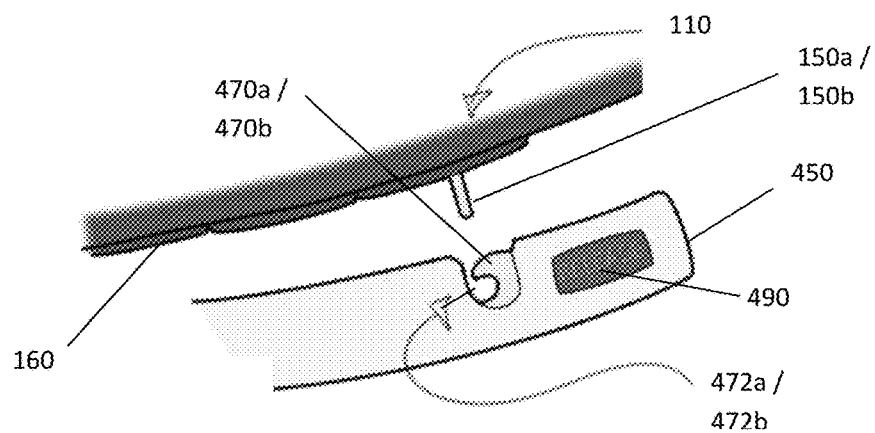

FIGS. 7A-7B illustrate an example of a technique for detachably mounting the wearable baby carrier 100 to the baby device 400. As shown in FIG. 7A, the protrusions 480a, 480b of the wearable baby carrier 100 are hooks configured for insertion into respective openings 170a, 170b at the interface component 450 of the baby device 400. During use, the protrusions 170a, 170b of the baby carrier 100 are first inserted into the openings 170a, 170b at the baby device 400. Such may be accomplished by positioning the baby carrier 100 in a first direction that is substantially perpendicular to (e.g., having an angle that is 90°+/−30° with respect to) the receiving surface of the interface component 450, and also in a second direction that is substantially parallel to (e.g., having an angle that is 0°+/−30° with respect to) the receiving surface. Alternatively, the protrusion 170 may be inserted at an acute angle with respect to the receiving surface into the opening 180. After the protrusion 170 has been inserted into the opening 480, the protrusion 170 (e.g., hook) anchors against a part 710 of the baby device 400.

After the protrusions 170 of the baby carrier 100 have been inserted into the openings 480 at the baby device 400, the device connectors 150 of the baby carrier 100 can then be coupled with respective connectors 470 at the baby device 400. As shown in FIG. 7B, the device connectors 150a, 150b are loops, and the connectors 470 at the baby device 400 are hooks. The device connectors 150a, 150b (e.g., loops) are configured to be inserted into respective holes (or openings) 472a, 472b for allowing respective connectors (e.g., hooks 470a, 470b) to catch against. In the illustrated embodiments, each hook is moveable relative to the interface component 450, so that when the device connector (e.g., loop) 150 is pushed into the opening 472, the hook will be pushed out of the way of the device connector 150. When the loop has moved past the hook, the hook will spring back into the locking position to catch the hook, which prevents the hook from being disengaged with the interface component 450. The interface component 450 of the baby device 400 also includes a release button 490 configured to operate the connectors 470 (e.g., hooks) to release the device connectors 150 (e.g., loops) from the connectors 470 (e.g., hooks).

Figure 8:
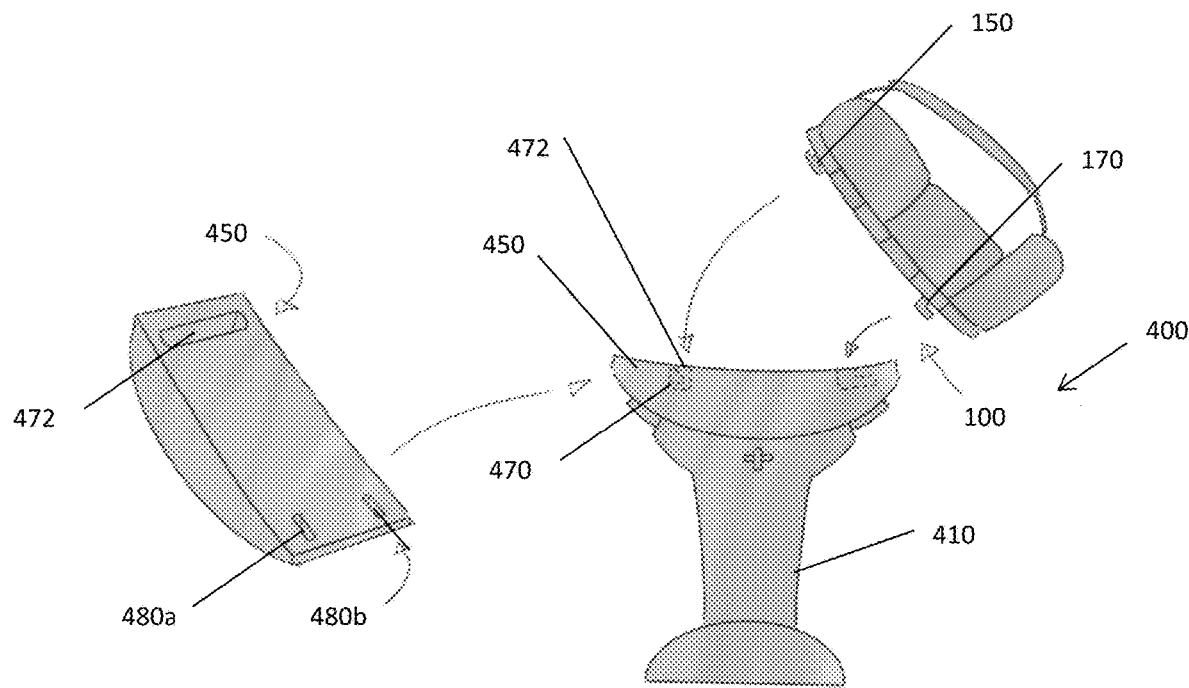
FIG. 8 illustrates another example of a baby device to which the wearable baby carrier of FIG. 1 is configured to detachably attach.
Figure 9:
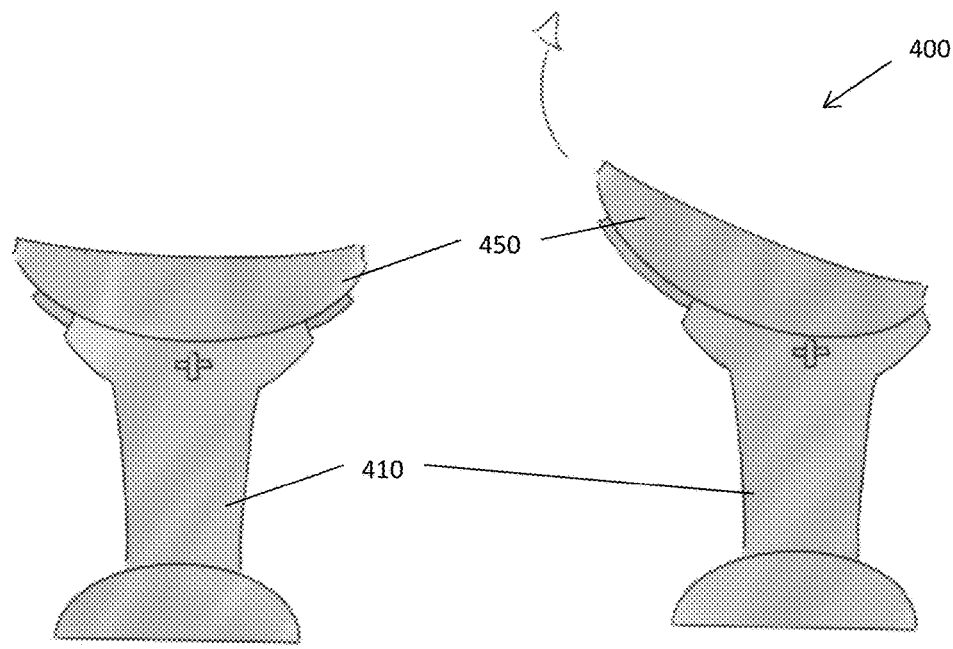
FIG. 9 illustrates the baby device of FIG. 8, particularly showing an interface component moveable relative to a base of the baby device.

It should be noted that the baby device 400 is not limited to the configuration shown in FIG. 4, and that the baby device 400 may have other configurations in other embodiments. For example, as shown in FIG. 8, in other embodiments, the baby device 400 may be a stationary baby support having a different form factor from that shown in FIG. 4. In the embodiments of FIG. 8, the baby device 400 includes a base 410 and an interface component 450 that is rotatably coupled to the base 410. During use, the interface component 450 may be selectively rotated relative to the base 410 to adjust an orientation (e.g., angle) and height of the interface component 450 relative to the base 410 (FIG. 9). As similarly described, when the wearable baby carrier 100 is in the first operation mode, the wearable baby carrier 100 is configured to support a weight of a baby while the wearable baby carrier 100 is worn by the user via the first strap 120a and the second strap 120b. When the wearable baby carrier 100 is in the second operation mode, the wearable baby carrier 100 is configured to detachably couple to the baby device 400 via the device connector 150 while the wearable baby carrier 100 is not worn by the user. In the example shown in FIG. 8, the baby carrier 100 has one device connector 150 configured to be inserted into a corresponding connection hole 472 at the interface component 450. The baby carrier 100 also includes protrusions 170 configured for insertion into respective openings 480a, 480b at the interface component 450. In other embodiments, the baby carrier 100 may include multiple device connectors 150 for detachably coupling with respective connectors at the interface component 450.

Figure 10:
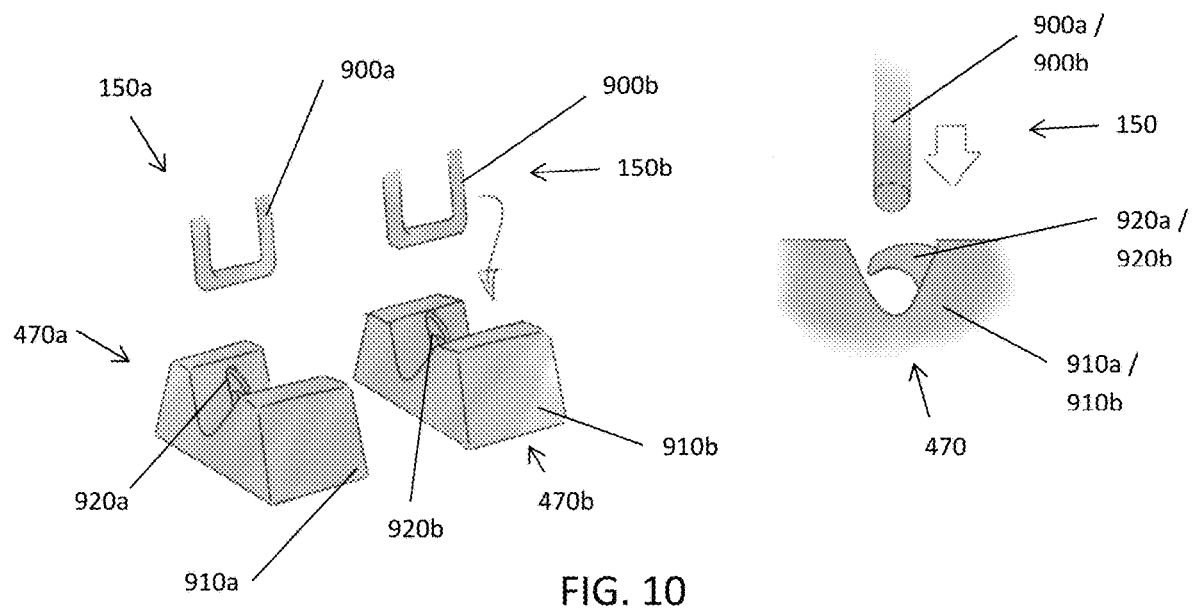
FIG. 10 illustrates an example of connectors that may be used to detachably couple the baby carrier of FIG. 1 to a baby device.

It should be noted that the wearable baby carrier 100 may be detachably coupled to the baby device 400 using different types of connectors in different embodiments. As described in the previous example, in some embodiments, the device connectors 150 at the wearable baby carrier 100 may be rigid loops. FIG. 10 illustrates an example of the loops 900a, 900b (which may be considered as an example of the device connectors 150a, 150b). As shown in the figure, the loops 900a, 900b are configured to engage with hooks 920a, 920b in respective connector housings 910a, 910b. The connector housings 910a, 910b may be secured to a body of the interface component 450 to form permanent parts of the interface component 450. In the illustrated embodiments, each connector housing 910 has a hook 920 that is moveable relative to the connector housing 910, and a spring (not shown) located inside the connector housing 910. During use, the loops 900a, 900b of the wearable baby carrier 100 may be pressed towards the respective hooks 920a, 920b. This will cause at least parts of the hooks 920a, 920b to temporarily move inside the respective housings 910a, 910b. After the loops 900a, 900b have moved past the hooks 920a, 920b, the hooks 920a, 920b will spring back outside the housings 910a, 910b, locking the loops 900a, 900b to prevent them from being detached from the interface component 450.

Figure 11:
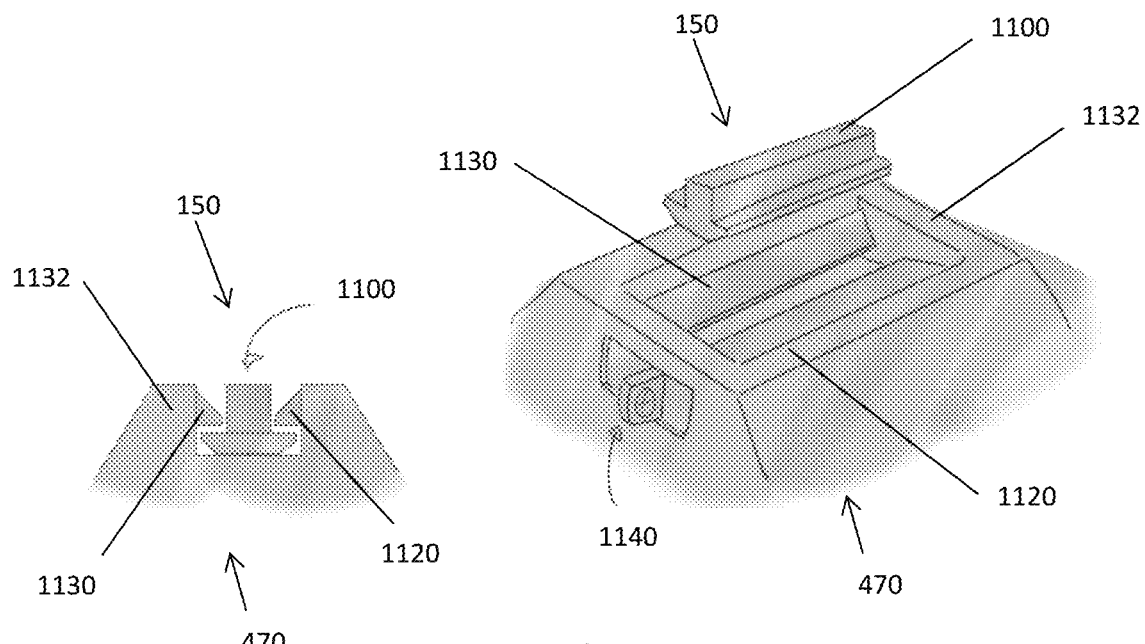
FIG. 11 illustrates another example of connectors that may be used to detachably couple the baby carrier of FIG. 1 to a baby device.

FIG. 11 illustrates another example of connectors that may be used to detachably couple the baby carrier of FIG. 1 to a baby device. In the illustrated embodiments, the device connector 150 of the baby carrier 100 is in the form of an elongate anchor 1100. The elongate anchor 1100 is configured for insertion into a receiving unit 1132 having opposing jaws 1120, 1130. The jaws 1120, 1130 have respective slated surfaces that receive the elongate anchor 1100. The slanted surfaces allow the elongate anchor 1100 to push the opposing jaws 1120, 1130 away from each other. As a result, the elongate anchor 1100 can be pushed into the receiving unit 1132 past the jaws 1120, 1130. As soon as the elongate anchor 1100 passes the jaws 1120, 1130, the jaws 1120, 1130 will spring back (due to one or more springs located in the unit 1132) to latch against the anchor 1100. This, in turn, will cause the pad 110 of the baby carrier 100 to be detachably secured in place with respect to the baby device 400. The receiving unit 1132 has a latch release mechanism 1140 configured to open the jaws 1120, 1130 to release the anchor 1100. Releasing the anchor 1100 from the receiving unit 1132 will result in the baby carrier 100 being detached from the baby device 400. In other embodiments, the receiving unit 1132 may include only one jaw instead of two opposing jaws.

Figure 12:
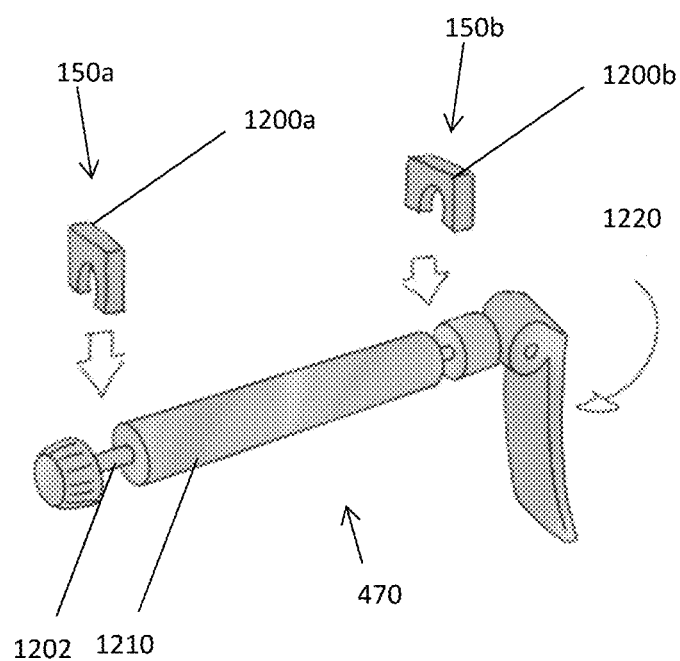
FIG. 12 illustrates another example of connectors that may be used to detachably couple the baby carrier of FIG. 1 to a baby device.

FIG. 12 illustrates another example of connectors that may be used to detachably couple the baby carrier of FIG. 1 to a baby device. In the illustrated embodiments, the device connectors 150a, 150b are in the form of tabs 1200a, 1200b. The tabs 1200a, 1200b are configured to mate with an axel 1202 of a cam lock 1210 at the baby device 400. The cam lock 1210 may be secured to the interface component 450, and may form a part of the interface component 450. The axel 1202 or the entire cam lock 1210 may be considered an example of the connector 470 at the baby device 400. During use, the tabs 1200a, 1200b at the baby carrier 100 may be placed around the axel 1202 of the cam lock 1210 at the baby device 400. Then a locking handle 1220 at the cam lock 1210 may be turned to secured the tabs 1200a, 1200b relative to the axel 1202. This, in turn, will cause the pad 110 of the baby carrier 100 to be detachably secured in place with respect to the baby device 400.

Figure 13:
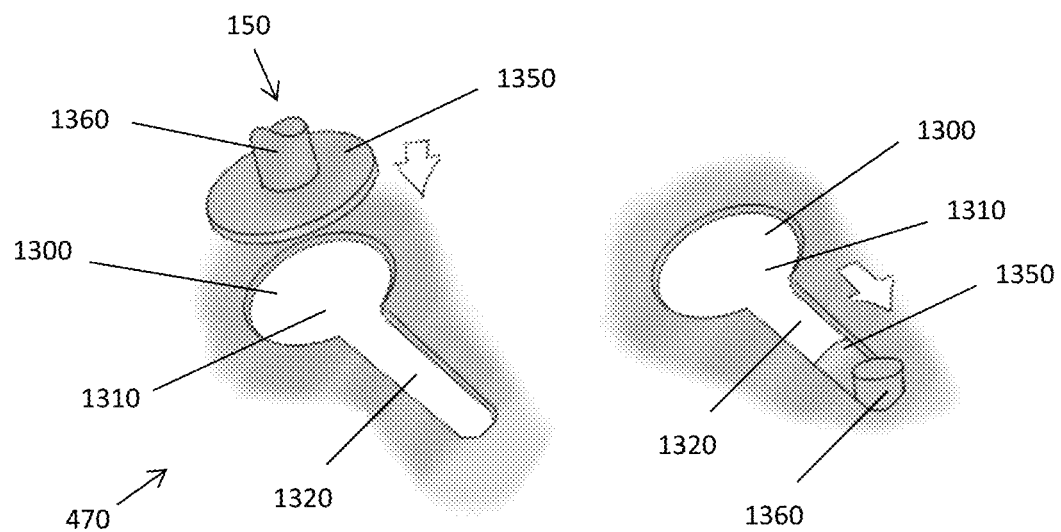
FIG. 13 illustrates another example of connectors that may be used to detachably couple the baby carrier of FIG. 1 to a baby device.

FIG. 13 illustrates another example of connectors that may be used to detachably couple the baby carrier of FIG. 1 to a baby device. In the illustrated embodiments, the device connector 150 of the baby carrier 100 is in the form of a disc 1350 having a post 1360. The disc 1350 is configured for insertion into a key hole 1300 at the baby device 400. As shown in the figure, the key hole 1300 has a larger part 1310 that allows the disc 1350 to be inserted therethrough, and a smaller part 1320 that accommodates the post 1360. The key hole 1300 may be considered an example of the connector 470 at the baby device 400. During use, the disc 1350 at the baby carrier 100 may be inserted into the larger part 1310 of the key hole 1300. After the disc 1350 has been inserted, the baby carrier 100 may be translated relative to the baby device 400 to move the post 1360 into the smaller part 1320 of the key hole 1300. As a result, the disc 1350 is locked against the structure defining the key hole 1300. This, in turn, will cause the pad 110 of the baby carrier 100 to be detachably secured in place with respect to the baby device 400.

Alternatively, the disc 1350 with the post 1360 may be used to implement the protrusion 170 at the baby carrier 100. In such cases, the key hole 1300 may be considered as an example of the opening 480 located at the interface component 450 of the baby device 400.

It should be noted that the connectors for detachably coupling the wearable baby carrier 100 to the baby device 400 are not limited to the examples described, and that different types of connectors and/or connection schemes may be used in other embodiments. For example, in other embodiments, any of the examples of the device connector 150 (such as the loops 900a, 900b) may be implemented at the interface component 450 of the baby device 400. Similarly, any of the examples of the connector 470 may be implemented at the baby carrier 100. In further embodiments, instead of having multiple protrusions 170 at the baby carrier 100, the baby carrier 100 may have only one protrusion 170, or no protrusion 170. In other embodiments, instead of having multiple device connectors 150 at the baby carrier 100, the baby carrier 100 may have only one device connector 150. Also, in other embodiments, instead of having a combination of different connector elements (e.g., protrusion(s) 170 plus loop(s) 900), the baby carrier 100 may have a number of the same kind of connector elements (e.g., only one kind of connector elements). For example, in other embodiments, both the device connector 150 and the protrusion 170 may be respective loops (like the loop 900). Furthermore, in other embodiments, the device connector(s) 150 may be implemented using buttons (e.g., snap buttons), clip(s), clamp(s), etc.

Figures 14A, 14B:
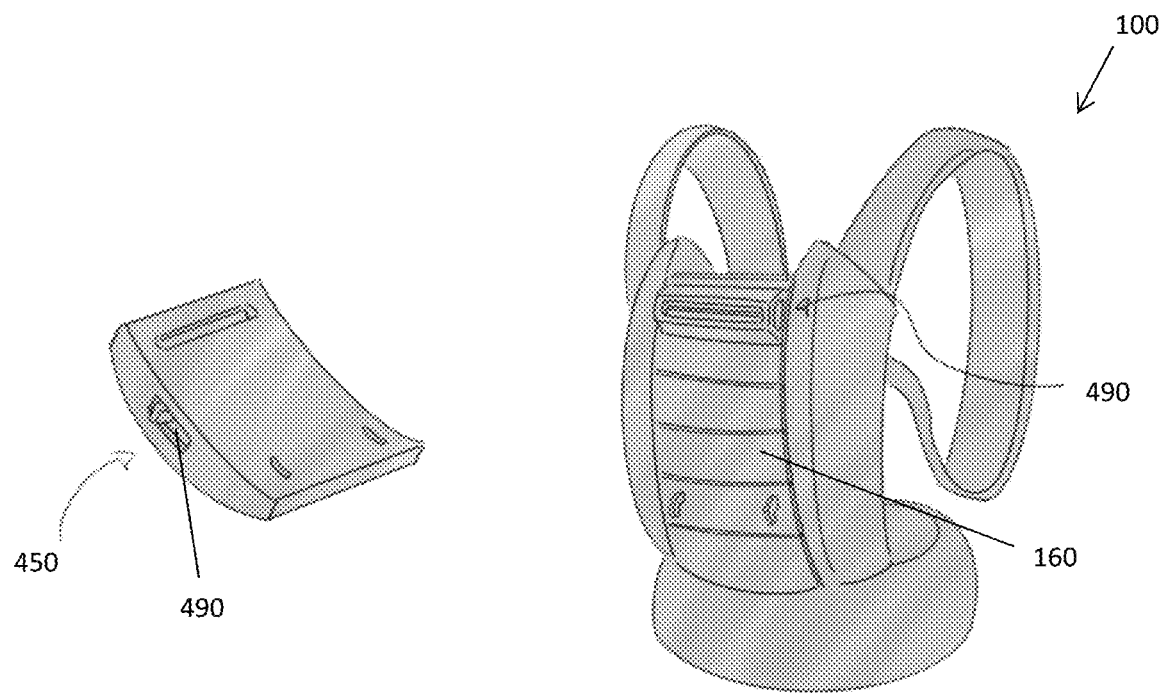
FIG. 14A illustrates an example of a component of a baby device having a latch release.
FIG. 14B illustrates an example of a wearable baby device having a latch release.

As described in some embodiments, the baby device 400 may include a latch release mechanism 490 for releasing the wearable baby carrier 100 from the baby device 400 (FIG. 14A). In other embodiments, the latch release mechanism 490 may be implemented at the wearable baby carrier 100 (FIG. 14B). The latch release mechanism 490 may be coupled to the spine 160. In such cases, the latch release mechanism 490 is indirectly coupled to the pad 110. In other embodiments, the latch release mechanism 490 may be directly coupled to the pad 110. The latch release mechanism 490 may be a button, a slider, a knob, etc., or any of other mechanisms that allow detachment of two items.

Figure 15:
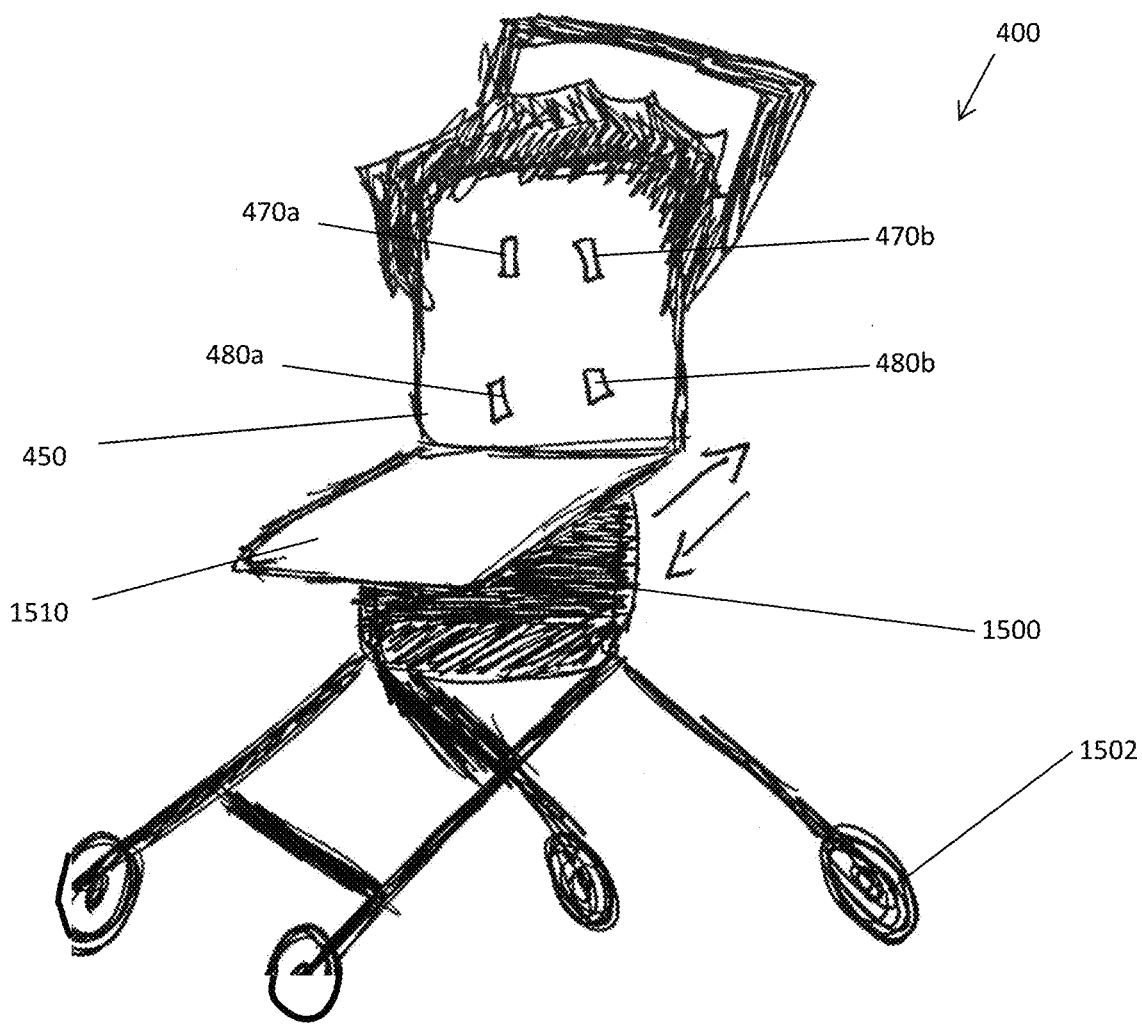
FIG. 15 illustrates another example of a baby device to which the wearable baby carrier of FIG. 1 is configured to detachably attach.

It should be noted that the baby device 400 is not limited to a stationary baby support, and that the baby device 400 may be other types of baby products. FIG. 15 illustrates another example of a baby device 400 to which the wearable baby carrier 100 of FIG. 1 is configured to detachably attach. In the illustrated embodiments, the baby device 400 of FIG. 15 is a stroller. The stroller includes a base 1500 with wheels 1502, and an interface component 450 moveably coupled to the base 1500 of the stroller. The interface component 450 is similar to the one described with reference to FIG. 4, and it includes connectors 470a, 470b for detachably coupling with the device connectors 150a, 150b of the baby carrier 100. The interface component 450 also includes openings 480a, 480b for receiving the protrusions 170a, 170b of the baby carrier 100. As shown in FIG. 15, the stroller also includes a platform 1510 that is coupled to the interface component 450. The platform 1510 may support part of a weight of a baby when the baby carrier 100 is coupled with the interface component 450 of the stroller. In some embodiments, the orientation (e.g., angle) and/or the height of the interface component 450 relative to the base 1500 of the stroller may be adjusted, such as by sliding the platform 1510 in the directions indicated by the arrows. In other embodiments, the interface component 450 may have fewer or more number of device connectors 470, and/or may have fewer or more number of openings 480. Also, in other embodiments, the interface component 450 may have other types of connector for detachably coupling with corresponding device connector(s) at the baby carrier 100. In further embodiments, instead of the openings 480, the interface component 450 may have the protrusion(s) 470. In such cases, the baby carrier 100 may include the opening(s) 480 instead of the protrusion(s) 470. In further embodiments, the location(s) of the connector(s) at the interface component 450 for detachably coupling with the baby carrier 100 may be different from those shown in the example.

During use of the baby stroller of FIG. 15, the user of the wearable baby carrier 100 carrying the baby may remove the wearable baby carrier 100 from the user. The user may then place the baby carrier 100 onto the interface component 450 of the baby stroller, and may utilize the device connector(s) at the baby carrier 100 to couple the baby carrier 100 with the interface component 450 of the baby stroller. The user may also optionally remove the straps 120a, 120b (and also the waist strap 180) from the pad 110 of the baby carrier 100. Alternatively, the user wearing the baby carrier 100 may simply walk up to the baby stroller, and position the baby carrier 100 onto the interface component 450 of the stroller while the user is wearing the baby carrier 100. The user may then couple the baby carrier 100 with the baby stroller using the device connector(s) at the baby carrier 100, and may then remove the baby carrier 100 from the user.

It should be noted that the stroller is not limited to the configuration shown, and that the stroller may have other configurations in other embodiments. For example, in other embodiments, the stroller may have a stroller seat coupled to the base. In such cases, the interface component 450 may be coupled to the seat. In some embodiments, the stroller seat may be reversible, so that a user has an option to place a baby in a forward or backward direction. In further embodiments, the interface component 450 may be provided as a part of a stroller seat that is detachably coupled to the base 1500 of the stroller. The seat may be selectively coupled to the base 1500 in different directions, so that the baby is facing the user, or away from the user. In some embodiments, the seat is reclinable—e.g., the body supporting part of the seat may be reclined completely in some embodiments.

In some embodiments, the wheels 1502 of stroller may be all-terrain wheels. Also, in some embodiments, the stroller may have all-wheel suspension. The stroller may optionally include one or more storage compartments. In addition, in some embodiments, the stroller may have an adjustable handle bar. Furthermore, in some embodiments, the stroller may include foot activated brakes. Also, in some embodiments, the stroller may optionally include a belly bar for the baby.

FIG. 16 illustrates another example of a baby device 400 to which the wearable baby carrier 100 of FIG. 1 is configured to detachably attach. In the illustrated embodiments, the baby device 400 of FIG. 16 is a baby-rocker. The baby-rocker includes a base 1600, and an interface component 450 moveably coupled to the base 1600 of the baby-rocker. The interface component 450 is similar to the one described with reference to FIG. 4, and it includes connectors 470a, 470b for detachably coupling with the device connectors 150a, 150b of the baby carrier 100. The interface component 450 also includes openings 480a, 480b for receiving the protrusions 170a, 170b of the baby carrier 100. As shown in FIG. 16, the baby-rocker also includes structural members 1610 that couples the interface component 450 to the base 1600. In some embodiments, the orientation (e.g., angle) and/or the height of the interface component 450 relative to the structural members 1610 of the baby-rocker may be adjustable. In other embodiments, the interface component 450 may have fewer or more number of device connectors 470, and/or may have fewer or more number of openings 480. Also, in other embodiments, the interface component 450 may have other types of connector for detachably coupling with corresponding device connector(s) at the baby carrier 100. In further embodiments, instead of the openings 480, the interface component 450 may have the protrusion(s) 470. In such cases, the baby carrier 100 may include the opening(s) 480 instead of the protrusion(s) 470. In further embodiments, the location(s) of the connector(s) at the interface component 450 for detachably coupling with the baby carrier 100 may be different from those shown in the example.

During use of the baby-rocker of FIG. 16, the user of the wearable baby carrier 100 carrying the baby may remove the wearable baby carrier 100 from the user. The user may then place the baby carrier 100 onto the interface component 450 of the baby-rocker, and may utilize the device connector(s) at the baby carrier 100 to couple the baby carrier 100 with the interface component 450 of the baby-rocker. The user may also optionally remove the straps 120a, 120b (and also the waist strap 180) from the pad 110 of the baby carrier 100. Alternatively, the user wearing the baby carrier 100 may simply walk up to the baby-rocker, and position the baby carrier 100 onto the interface component 450 while the user is wearing the baby carrier 100. The user may then couple the baby carrier 100 with the baby-rocker using the device connector(s) at the baby carrier 100, and may then remove the baby carrier 100 from the user.

FIG. 17 illustrates another example of a baby device 400 to which the wearable baby carrier 100 of FIG. 1 is configured to detachably attach. In the illustrated embodiments, the baby device 400 of FIG. 17 is a baby chair. The baby chair includes a base 1700, and an interface component 450 coupled to the base 1700 of the baby chair. The interface component 450 may be fixedly coupled to the base 1700, or may be moveably coupled to the base 1700. In some embodiments, the orientation (e.g., angle) and/or the height of the interface component 450 relative to the base 1700 of the baby chair may be adjustable. The interface component 450 is similar to the one described with reference to FIG. 4, and it includes connectors 470a, 470b for detachably coupling with the device connectors 150a, 150b of the baby carrier 100. The interface component 450 also includes openings 480a, 480b for receiving the protrusions 170a, 170b of the baby carrier 100. In some embodiments, the orientation (e.g., angle) of the interface component 450 relative to the base 1700 of the baby chair may be adjustable. In other embodiments, the interface component 450 may have fewer or more number of device connectors 470, and/or may have fewer or more number of openings 480. Also, in other embodiments, the interface component 450 may have other types of connector for detachably coupling with corresponding device connector(s) at the baby carrier 100. In further embodiments, instead of the openings 480, the interface component 450 may have the protrusion(s) 470. In such cases, the baby carrier 100 may include the opening(s) 480 instead of the protrusion(s) 470. In further embodiments, the location(s) of the connector(s) at the interface component 450 for detachably coupling with the baby carrier 100 may be different from those shown in the example.

During use of the baby chair of FIG. 17, the user of the wearable baby carrier 100 carrying the baby may remove the wearable baby carrier 100 from the user. The user may then place the baby carrier 100 onto the interface component 450 of the baby chair, and may utilize the device connector(s) at the baby carrier 100 to couple the baby carrier 100 with the interface component 450 of the baby chair. The user may also optionally remove the straps 120a, 120b (and also the waist strap 180) from the pad 110 of the baby carrier 100. Alternatively, the user wearing the baby carrier 100 may simply walk up to the baby chair, and position the baby carrier 100 onto the interface component 450 while the user is wearing the baby carrier 100. The user may then couple the baby carrier 100 with the baby chair using the device connector(s) at the baby carrier 100, and may then remove the baby carrier 100 from the user.

FIG. 18 illustrates another example of a baby device 400 to which the wearable baby carrier 100 of FIG. 1 is configured to detachably attach. In the illustrated embodiments, the baby device 400 of FIG. 18 is a child car seat. The child car seat includes a base 1800, and an interface component 450 coupled to the base 1700 of the child car seat. The base 1700 may be adjustable in some embodiments, so that an incline angle of the base 1700 can be selectively configured. In some embodiments, the base 1700 may be sized so that it fits all car sizes. The interface component 450 may be fixedly coupled to the base 1700, or may be moveably coupled to the base 1700. In some embodiments, body supporting part of the child car seat (e.g., including at least a part of the interface component 450) may be reclinable. The interface component 450 is similar to the one described with reference to FIG. 4, and it includes connectors 470a, 470b for detachably coupling with the device connectors 150a, 150b of the baby carrier 100. The interface component 450 also includes openings 480a, 480b for receiving the protrusions 170a, 170b of the baby carrier 100. In some embodiments, the orientation (e.g., angle) of the interface component 450 and/or a height of the interface component 450 relative to the base 1800 of the child car seat may be adjustable. In other embodiments, the interface component 450 may have fewer or more number of device connectors 470, and/or may have fewer or more number of openings 480. Also, in other embodiments, the interface component 450 may have other types of connector for detachably coupling with corresponding device connector(s) at the baby carrier 100. In further embodiments, instead of the openings 480, the interface component 450 may have the protrusion(s) 470. In such cases, the baby carrier 100 may include the opening(s) 480 instead of the protrusion(s) 470. In further embodiments, the location(s) of the connector(s) at the interface component 450 for detachably coupling with the baby carrier 100 may be different from those shown in the example.

During use of the child car seat of FIG. 18, the user of the wearable baby carrier 100 carrying the baby may remove the wearable baby carrier 100 from the user. The user may then place the baby carrier 100 onto the interface component 450 of the child car seat, and may utilize the device connector(s) at the baby carrier 100 to couple the baby carrier 100 with the interface component 450 of the child car seat. The user may also optionally remove the straps 120a, 120b (and also the waist strap 180) from the pad 110 of the baby carrier 100. Alternatively, the user wearing the baby carrier 100 may simply walk up to the child car seat, and position the baby carrier 100 onto the interface component 450 while the user is wearing the baby carrier 100. The user may then couple the baby carrier 100 with the child car seat using the device connector(s) at the baby carrier 100, and may then remove the baby carrier 100 from the user.

In one or more embodiments described herein, the interface component 450 may be manufactured as a part of the baby device 400. Alternatively, the interface component 450 may be provided separately from the baby device 400. In such cases, the interface component 450 may be used to interface the wearable baby carrier 100 with one or more conventional baby devices 400. For example, a baby device 400 may be an off-the-shelf baby device that does not have attachment capability with the wearable baby carrier 100. In such cases, the interface component 450 may be placed on the baby device 400, so that the interface component 450 can be used to detachably couple the wearable baby carrier 100 with the baby device 400. In one implementation, the interface component 450 may be an insert with connector(s) for detachably coupling with the device connector(s) of the wearable baby device 100. In some embodiments, the interface component 450 may include one or more mounting mechanisms (e.g., straps, ties, Velcro, clips, etc.) for attachment to the baby device 400.

In some embodiments, a baby support system may be provided. The baby support system may include the wearable baby carrier 100, and one or more baby devices 400. By means of non-limiting examples, the baby device 400 may be at least a part of a stationary baby support (such as the one shown in FIG. 4 or 8), at least a part of a stroller (such as the one shown in FIG. 15), at least a part of a baby-rocker (such as the one shown in FIG. 16), at least a part of a baby chair (such as the one shown in FIG. 17), at least a part of a child car seat (such as the one shown in FIG. 18), etc. The wearable baby carrier 100 is configured to detachably couple to the part of the stationary baby support via one or more device connectors, to the part of the stroller via one or more device connectors, to the part of the baby-rocker via one or more device connectors, to the part of the baby chair via one or more device connectors, to the base of the child car seat via one or more device connectors, etc.

As illustrated in the above embodiments, the wearable baby carrier 100 and the baby devices 400 are advantageous because they allow transfer of a baby onto any of the baby devices 400 without the need to remove the baby from the baby carrier 100. If the baby is asleep in the baby carrier 100, the baby is already in a comfort state and is adjusted to the temperature of the baby carrier 100. The transfer of the wearable baby carrier 100 onto the baby device 400 without removing the baby from the wearable baby carrier 100 allows the baby to continue to maintain in the comfort state. This, in turn, may allow the baby to continue to sleep without waking up the baby.

In one or more embodiments described herein, the baby carrier 100 may optionally further include an accessory for coupling with the pad 110 of the baby carrier 100. For example, in some embodiments, the accessory may be a safety belt with connectors configured to couple with the pad 110. The safety belt is configured to prevent the baby from rolling off the pad 110 or from falling off the pad 110 after the pad 110 is removed from the user, and after the pad 110 is coupled with a baby device 400. In some embodiments, the safety belt may be designed to meet safety standards for a particular application. For example, in the embodiments in which the baby device 400 is a baby chair (FIG. 17), the safety belt for attachment to the baby carrier 100 may be configured to meet safety standards of baby chairs. Similarly, in the embodiments in which the baby device 400 is a child car seat (FIG. 18), the safety belt for attachment to the baby carrier 100 may be configured to meet safety standards of child car seats.

In addition, in one or more embodiments described herein, the baby device 400 may optionally also include a hydraulic jack. The hydraulic jack may be configured to lift at least a part of the baby device 400 so that a height of the interface component 450 can be adjusted for allowing a user to easily place the baby carrier 100 onto the interface component 450. For example, in the case where the baby device 400 is a stroller, a control for activating a hydraulic jack may be provided at a handle bar. The control may be activated to cause the hydraulic jack to move a stroller chair upward. The control may also be deactivated to cause the hydraulic jack to move a stroller chair downward. In other embodiments, the stroller may have two controls on opposite sides of the stroller handle bar, wherein each of the controls may be selectively activated or deactivated to operate the hydraulic jack. In some embodiments, the hydraulic jack is configured to provide a lifting force that is at least 50 lb, at least 100 lb, at least 150 lb, or at least 200 lb.

Although the above embodiments have been described with reference to the carrier 100 being configured for carrying a baby, in other embodiments, the carrier 100 may be configured for carrying a pet (e.g., a dog, a cat, etc.). In such cases, the carrier 100 is a pet carrier 100. The pet carrier 100 may be configured to detachably couple with one or more pet devices, such as a stationary pet support, a pet stroller, etc.

As used in this specification, the term "baby carrier" refers to a device that can be used to carry a baby, wherein such device may or may not include shoulder straps attached to the pad. For example, a baby carrier may be a device with shoulder straps attached to a pad that allows a user to carry a baby while wearing the baby carrier in one operation mode. In another operation mode, the straps may be detached from the pad. In such cases, the pad itself without the straps may also be considered a "baby carrier".

Also, as used in this specification, the term "connector" may refer to any mechanism that is configured for connecting or coupling two items, either directly or indirectly. A connector may be a detachable connector that allows the two items to be detached after they are coupled together. By means of non-limiting examples, a detachable connector may be a snap-fit connector, a frictional fit connector, a button (e.g., a snap button), a hook, an anchor, a protrusion, an opening, a key hole, a disc, a jaw, a tab, an axle, etc., or at least a part of any of the foregoing. Thus, the protrusion 170 described herein may itself be considered as a connector. Similarly, the opening 480 or the keyhole 1300 described herein may also be considered as a connector. In some cases, a connector may be a permanent connector that permanently couple two items. By means of non-limiting examples, a permanent connector may be stitching, adhesive, welding, etc.

The following items are exemplary features of embodiments described herein. Each item may be an embodiment itself or may be a part of an embodiment. One or more items described below may be combined with other item(s) in an embodiment.

Item 1: A wearable baby carrier includes: a pad; a first strap coupled to, or configured for coupling to, the pad via a first strap connector, wherein the first strap is configured to extend over a first shoulder of a user of the wearable baby carrier; a second strap coupled to, or configured for coupling to, the pad via a second strap connector, wherein the second strap is configured to extend over a second shoulder of the user; and a first device connector coupled to the pad; wherein the wearable baby carrier has a first operation mode, and a second operation mode; wherein in the first operation mode, the wearable baby carrier is configured to support a weight of a baby while the wearable baby carrier is worn by the user via the first strap and the second strap; and wherein in the second operation mode, the wearable baby carrier is configured to detachably couple to a baby device via the first device connector while the wearable baby carrier is not worn by the user.

Item 2: The wearable baby carrier further includes a spine coupled to the pad.

Item 3: The spine comprises a plurality of spine components that are moveably connected in a series.

Item 4: The first device connector comprises a first rigid loop configured to detachably couple with a first latch at the baby device.

Item 5: The wearable baby carrier further includes a second rigid loop coupled to the pad, wherein the second rigid loop is configured to detachably couple with a second latch at the baby device.

Item 6: The wearable baby carrier further includes a first protrusion configured for insertion into a first opening of the baby device.

Item 7: The first protrusion comprises a first hook configured to anchor against a part of the baby device when the first hook is inserted into the first opening of the baby device.

Item 8: The wearable baby carrier further includes a second protrusion configured for insertion into a second opening of the baby device.

Item 9: The first device connector of the wearable baby carrier is configured to detachably couple to a first connector of the baby device, wherein one of the first device connector of the wearable baby carrier and the first connector of the baby device comprises a key hole, and the other one of the first device connector of the wearable baby carrier and the first connector of the baby device comprises a disc for insertion into the key hole.

Item 10: The first device connector comprises one or more tabs configured to mate with an axel of a cam lock at the baby device.

Item 11: The wearable baby carrier further includes a latch release mechanism coupled to the pad.

Item 12: The wearable baby carrier further includes a second device connector coupled to the pad, wherein the first device connector and the second device connector are configured to detachably couple to a first connector and a second connector, respectively, at the baby device.

Item 13: The first strap connector comprises a first snap-fit connector, and the second strap connector comprises a second snap-fit connector.

Item 14: The baby device comprises at least a part of a stationary baby support, and wherein the wearable baby carrier is configured to detachably couple to the part of the stationary baby support via the first device connector.

Item 15: The baby device comprises at least a part of a stroller, and wherein the wearable baby carrier is configured to detachably couple to the part of the stroller via the first device connector.

Item 16: The baby device comprises at least a part of a baby-rocker, and wherein the wearable baby carrier is configured to detachably couple to the part of the baby-rocker via the first device connector.

Item 17: The baby device comprises at least a part of a baby chair, and wherein the wearable baby carrier is configured to detachably couple to the part of the baby chair via the first device connector.

Item 18: The baby device comprises at least a part of a child car seat, and wherein the wearable baby carrier is configured to detachably couple to the part of the child car seat via the first device connector.

Item 19: A baby support system includes the wearable baby carrier, and the baby device.

Item 20: The baby device comprises at least a part of a stationary baby support, at least a part of a stroller, at least a part of a baby-rocker, at least a part of a baby chair, or at least a part of a child car seat; and wherein the wearable baby carrier is configured to detachably couple to the part of the stationary baby support, to the part of the stroller via the first device connector, to the part of the baby-rocker via the first device connector, to the part of the baby chair via the first device connector, or to the part of the child car seat via the first device connector.

Item 21: The baby device comprises a base and an interface component moveably coupled to the base to adjust an angle of the interface component relative to the base; and wherein the wearable baby carrier is configured to detachably couple to the interface component of the baby device via the first device connector.

Item 22: A wearable baby carrier includes: a pad; a first strap coupled to, or configured for coupling to, the pad via a first strap connector, wherein the first strap is configured to extend over a first shoulder of a user of the wearable baby carrier; a second strap coupled to, or configured for coupling to, the pad via a second strap connector, wherein the second strap is configured to extend over a second shoulder of the user; a spine coupled to the pad, the spine comprising a plurality of spine components that are moveably connected in a series; a first device connector coupled to the pad; and a second device connector coupled to the pad; wherein the wearable baby carrier is configured to detachably couple to a baby device via the first connector when the wearable baby carrier is not worn by the user; and wherein the first device connector and the second device connector are configured to detachably couple to a first connector and a second connector, respectively, at the baby device.

Item 23: An interface component is configured for detachably coupling a wearable baby carrier with a baby device, the wearable baby carrier comprising a pad, a first strap configured for coupling to the pad via a first strap connector, a second strap configured for coupling to the pad via a second strap connector, and a first device connector; the interface component comprising: a receiving surface configured to receive the wearable baby carrier; a securing mechanism configured to secure the interface component to the baby device; and one or more connectors configured to detachably couple with corresponding one or more device connectors at the wearable baby carrier.

Item 24: A baby device includes the interface component.

Item 25: The baby device comprises a stationary baby support, a stroller, a baby-rocker, a baby chair, or a child car seat.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

What is claimed:

1. A wearable baby carrier comprising:
a pad;
a first strap coupled to, or configured for coupling to, the pad via a first strap connector, wherein the first strap is configured to extend over a first shoulder of a user of the wearable baby carrier;
a second strap coupled to, or configured for coupling to, the pad via a second strap connector, wherein the second strap is configured to extend over a second shoulder of the user; and
a first device connector coupled to the pad;
wherein the wearable baby carrier has a first operation mode, and a second operation mode;
wherein in the first operation mode, the wearable baby carrier is configured to support a weight of a baby while the wearable baby carrier is worn by the user via the first strap and the second strap; and
wherein in the second operation mode, the wearable baby carrier is configured to detachably couple to a baby device via the first device connector while the wearable baby carrier is not worn by the user;
wherein the wearable baby carrier further comprises a spine coupled to the pad, wherein the spine comprises a plurality of spine components that are moveably connected in a series.

2. The wearable baby carrier of claim 1, wherein the first device connector comprises a first rigid loop configured to detachably couple with a first latch at the baby device.

3. The wearable baby carrier of claim 2, further comprising a second rigid loop coupled to the pad, wherein the second rigid loop is configured to detachably couple with a second latch at the baby device.

4. The wearable baby carrier of claim 2, further comprising a first protrusion configured for insertion into a first opening of the baby device.

5. The wearable baby carrier of claim 4, wherein the first protrusion comprises a first hook configured to anchor against a part of the baby device when the first hook is inserted into the first opening of the baby device.

6. The wearable baby carrier of claim 4, further comprising a second protrusion configured for insertion into a second opening of the baby device.

7. The wearable baby carrier of claim 1, wherein the first device connector of the wearable baby carrier is configured to detachably couple to a first connector of the baby device, wherein one of the first device connector of the wearable baby carrier and the first connector of the baby device comprises a key hole, and the other one of the first device connector of the wearable baby carrier and the first connector of the baby device comprises a disc for insertion into the key hole.

8. The wearable baby carrier of claim 1, wherein the first device connector comprises one or more tabs configured to mate with an axel of a cam lock at the baby device.

9. The wearable baby carrier of claim 1, further comprising a latch release mechanism coupled to the pad.

10. The wearable baby carrier of claim 1, further comprising a second device connector coupled to the pad, wherein the first device connector and the second device connector are configured to detachably couple to a first connector and a second connector, respectively, at the baby device.

11. The wearable baby carrier of claim 1, wherein the first strap connector comprises a first snap-fit connector, and the second strap connector comprises a second snap-fit connector.

12. The wearable baby carrier of claim 1, wherein the baby device comprises at least a part of a stationary baby support, and wherein the wearable baby carrier is configured to detachably couple to the part of the stationary baby support via the first device connector.

13. The wearable baby carrier of claim 1, wherein the baby device comprises at least a part of a stroller, and wherein the wearable baby carrier is configured to detachably couple to the part of the stroller via the first device connector.

14. The wearable baby carrier of claim 1, wherein the baby device comprises at least a part of a baby-rocker, and wherein the wearable baby carrier is configured to detachably couple to the part of the baby-rocker via the first device connector.

15. The wearable baby carrier of claim 1, wherein the baby device comprises at least a part of a baby chair, and wherein the wearable baby carrier is configured to detachably couple to the part of the baby chair via the first device connector.

16. The wearable baby carrier of claim 1, wherein the baby device comprises at least a part of a child car seat, and wherein the wearable baby carrier is configured to detachably couple to the part of the child car seat via the first device connector.

17. A baby support system comprising the wearable baby carrier of claim 1, and the baby device.

18. The baby support system of claim 17, wherein the baby device comprises at least a part of a stationary baby support, at least a part of a stroller, at least a part of a baby-rocker, at least a part of a baby chair, or at least a part of a child car seat; and wherein the wearable baby carrier is configured to detachably couple to the part of the stationary baby support, the part of the stroller via the first device connector, to the part of the baby-rocker via the first device connector, to the part of the baby chair via the first device connector, or to the part of the child car seat via the first device connector.

19. The baby support system of claim 17, wherein the baby device comprises a base and an interface component moveably coupled to the base to adjust an angle of the interface component relative to the base; and wherein the wearable baby carrier is configured to detachably couple to the interface component of the baby device via the first device connector.

20. A wearable baby carrier comprising:
a pad;
a first strap coupled to, or configured for coupling to, the pad via a first strap connector, wherein the first strap is configured to extend over a first shoulder of a user of the wearable baby carrier;
a second strap coupled to, or configured for coupling to, the pad via a second strap connector, wherein the second strap is configured to extend over a second shoulder of the user;
a spine coupled to the pad, the spine comprising a plurality of spine components that are moveably connected in a series;
a first device connector coupled to the pad; and
a second device connector coupled to the pad;
wherein the wearable baby carrier is configured to detachably couple to a baby device via the first connector when the wearable baby carrier is not worn by the user; and
wherein the first device connector and the second device connector are configured to detachably couple to a first connector and a second connector, respectively, at the baby device.

21. An interface component configured for detachably coupling the wearable baby carrier of claim 1 with a baby device, the interface component comprising:
a receiving surface configured to receive the wearable baby carrier;
a securing mechanism configured to secure the interface component to the baby device; and
a connector configured to detachably couple with the first device connector of the wearable baby carrier.

22. A baby device comprising the interface component of claim 21.

23. The baby device of claim 22, wherein the baby device comprises a stationary baby support, a stroller, a baby-rocker, a baby chair, or a child car seat.

* * * * *